June 30, 1959
R. N. STEEL
2,892,216
EXPANDED MATERIAL AND METHOD OF MAKING SAME
Filed Oct. 12, 1955
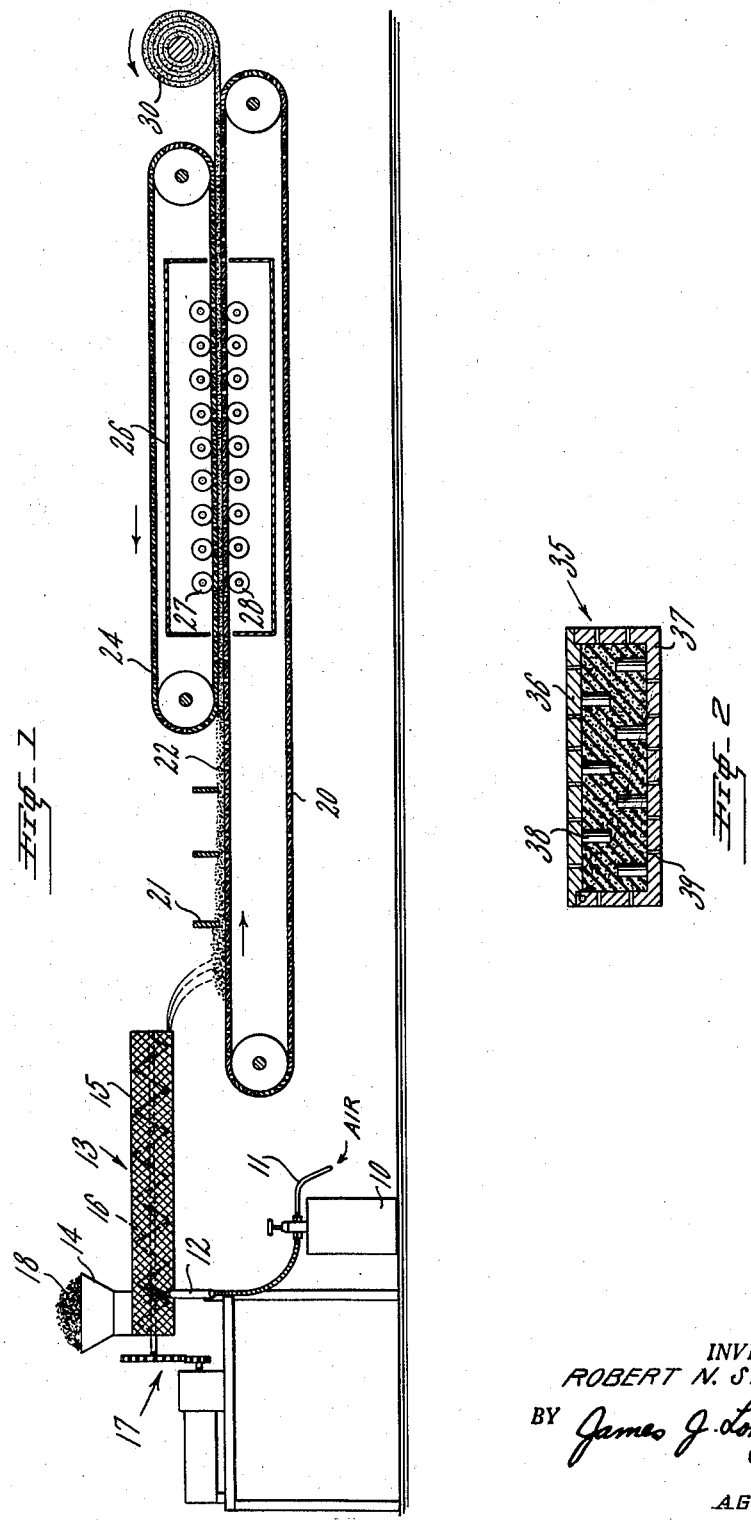
INVENTOR.
ROBERT N. STEEL
BY James J. Long
AGENT United States Patent Office 2,892,216
Patented June 30, 1959

2,892,216
EXPANDED MATERIAL AND METHOD OF MAKING SAME

Robert N. Steel, Mishawaka, Ind., assignor to United States Rubber Company, New York, N.Y., a corporation of New Jersey Application October 12, 1955, Serial No. 540,033

7 Claims. (Cl. 18—47.5)

This invention relates to a method of salvaging or reclaiming foamed or cellular expanded or blown scrap, such as latex foam rubber scrap, and more particularly it relates to a method of converting latex foam rubber scrap and the like into a more useful form in which it is bound into a continuous mass by a cured polyurethane elastomer. The invention also relates to an improved foamed elastic body comprising expanded or blown scrap, especially latex foam rubber scrap, permeated with an integrating network of polyurethane elastomer.

Conventional manufacture and processing of blown or expanded foam or cellular plastic or elastomeric materials ordinarily result in the production of considerable scrap or waste. Thus, in the manufacture of foam rubber or sponge rubber from natural or synthetic rubber latex by whipping the compounded rubber latex into a foam and vulcanizing the foam in a mold there is almost inevitably produced a sizable quantity of scrap, either because, for example, the molded products sometimes do not have the exact form desired and have to be discarded, or because certain parts of the molded shapes have to be cut away or trimmed to provide a desired shape, thus producing trimmings and the like of nondescript sizes and shapes that have little if any value as such. Since this scrap represents a considerable economic waste, there has been a continuing desire to provide a more feasible and more economical method of converting such scrap into good quality sponge or foam rubber sheets or slabs or articles of other shapes.

Accordingly, a principal object of the invention is to provide an economical and efficient method of converting latex foam rubber scrap and the like into useful forms or shapes.

Still another object is the provision of an improved reclaimed or salvaged sponge rubber scrap, or similar expanded or blown plastic or elastomeric scrap.

The manner in which the invention realizes the foregoing and additional objects and advantages will be made manifest in the following detailed description, which is intended to be read with reference to the accompanying drawing, wherein:

Fig. 1 represents in purely diagrammatic fashion a longitudinal elevational view of an apparatus suitable for use in one embodiment of the invention; and, Fig. 2 is a sectional view of a mold containing sponge rubber being molded in accordance with a modified practice of the invention.

The invention contemplates initially disintegrating or shredding the latex foam rubber scrap, or other plastic or elastomeric sponge scrap, into relatively small more or less uniform crumbs or granules or the like, which are thereafter treated with a liquid preparation comprising an uncured form of potentially elastomeric polyester-polyisocyanate intermediate reaction product containing available isocyanate groups. The thus treated crumbs are thereafter enclosed by a suitable confining means, such as a mold, and the mass while so confined is treated in such manner as to cure the isocyanate-containing intermediate and thereby convert it into a polyurethane elastomer. Such cure is affected by subjecting the mass to the action of water vapor, and for this purpose the mold or other confining means is provided with openings so that water vapor may be passed into the mass to effect the cure of the polyester-polyisocyanate intermediate. The action of the water vapor on the available isocyanate groups in the intermediate leads to a series of chemical reactions that result ultimately in a cured or cross-linked elastomeric polyurethane, with concurrent evolution of carbon dioxide gas, so that the polyurethane itself is permeated with bubbles or pores or cells formed by such gas. There is thus produced throughout the mass of foam rubber crumbs an integrating network of polyurethane foam or sponge that gives structure and form to the mass and confers on it a desirable quality of elasticity. The final mass is strong and firmly bonded together, while being elastic and resilient and otherwise possessed of the good physical properties desired in a foam or sponge. This is particularly unexpected in view of the fact that it has been observed in other instances that the polyurethane elastomer does not adhere well to vulcanized rubber.

The polyester-diisocyanate intermediate reaction product which is admixed with the shredded latex foam rubber scrap in accordance with the invention is typically prepared from an anhydrous chain-extended polyester made from a glycol, for example, a mixture of ethylene and propylene glycols, and an aliphatic saturated dicarboxylic acid, for example, adipic acid, using an excess of glycol over the acid so that the resulting polyester contains terminal alcoholic hydroxyl groups. Such polyester may be linear, or it may be branched, the latter effect being achieved by including in the preparation a trialcohol, such as trimethylolpropane or trimethylolmethane. Usually such an amount of glycol is used as to give a polyester having a hydroxyl number of 20 to 120, and preferably 36 to 67, and a low acid value less than 2 and preferably less than 1. The molecular weight of the polyester preferably ranges from 1700 to 3000. The polyester employed may also be a polyester amide. Polyethers, especially polyetherglycols having terminal alcoholic hydroxyl groups, may also be used in place of polyesters. The polyester or the like is reacted with a polyisocyanate, for example, triphenylmethane triisocyanate, naphthalene 1,5-diisocyanate, or p,p'-diphenylmethane diisocyanate, using a considerable molar excess, commonly from a 20% to a 250% and preferably from a 50% to a 100% molar excess, of the polyisocyanate over that amount which would be required to react with all of the alcoholic hydroxyl groups furnished by the polyester. The reaction is frequently affected by heating a mixture of the polyester, or similar high molecular weight compound having two or more alcoholic hydroxyl groups, and the polyisocyanate under anhydrous conditions at an elevated temperature, e.g. 70–150° C., to form a soluble, uncured, material which is a polyurethane having terminal isocyanate groups.

The polyisocyanates employed in preparing the polyester-polyisocyanate intermediate are generally diisocyanates, for example, polymethylene diisocyanates such as ethylene diisocyanate, hexamethylene diisocyanate and tetramethylene diisocyanate; alkylene diisocyanates such as propylene-1,2-diisocyanate; cycloalkylene diisocyanates such as 1,4-diisocyanatocyclohexane, as well as aromatic diisocyanates such as m- and p-phenylene diisocyanate, toluene diisocyanate, p,p'-diphenyl diisocyanate and 1,5-naphthylene diisocyanate, in which category we include aliphatic-aromatic diisocyanates such as p,p'-diphenylmethane diisocyanate and phenylethane diisocyanate

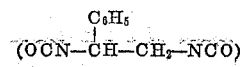

Triisocyanates are also suitable, such as those having isocyanate groups attached to a trivalent hydrocarbon radical, whether an aliphatic, aromatic, or aliphatic-aromatic radical as in butane-1,2,2-triisocyanate, benzene-1,3,5-triisocyanate, diphenyl-2,4,4' - triisocyanate, diphenyl-4,6,4'-triisocyanate, toluene - 2,4,6 - triisocyanate, ethyl benzene-2,4,6-triisocyanate and triphenylmethane - 4,4',4" - triisocyanate. Triisocyanates derived from corresponding substituted trivalent hydrocarbon radicals, such as monochlorobenzene-2,4,6-triisocyanate may also be used.

Many such polyester-polyisocyanate intermediate products, hereinafter referred to as the uncured polyurethane or polyurethane intermediate, can be thus prepared in the form of liquids utilizable directly for admixture with the shredded foam scrap, but if they are solids or unduly viscous liquids they are first dissolved in a suitable volatile organic solvent such as carbon tetrachloride, methyl isobutyl ketone, benzene, methyl ethyl ketone, ethyl acetate, etc., to facilitate application. The viscosity of the polyurethane intermediate or a solution thereof may be reduced by heating it to an elevated temperature (e.g. 100–200° F.) at the time of application, but in that event the intermediate should be protected from exposure to curing substances (including the moisture in the air), otherwise it may cure or set up prematurely, at least to the extent of becoming too viscous to spray or otherwise apply easily. Spraying under pressure of air or nitrogen is a preferred method of applying the intermediate to the rubber sponge particles.

As is well known, the polyurethane intermediate containing available isocyanate groups is capable of being cured by the action of various initiators of cross-linking, usually chemicals containing two or more hydrogen atoms available for reaction with the available isocyanate groups, notably water, or organic chemicals in general containing two or more —OH and/or —NH$_2$ and/or —SH groups. Among such known curing agents may be mentioned polyamines, notably primary diamines, such as hexamethylene diamine, p-phenylamine diamine, p,p'-diaminodiphenylmethane, o-dichlorobenzidine, and toluylenediamine; polyhydric alcohols, notably diols, such as butanediol; and polymercaptans such as hexamethylene dithiol. Compounds with mixed functional groups are also used, notably amino alcohols, such as amino ethanol and p-amino-phenylmethylcarbinol.

For purposes of the present invention the curing agent is appropriately utilized in the form of a vapor and is appropriately comprised for the most part of water, since water is unique among the foregoing agents in causing the release of carbon dioxide gas during the cure so that the polyurethane itself becomes blown or expanded in situ by the generated gas it is being cured within the massed crumbs of scrap rubber. Although the cure of the polyester-polyisocyanate intermediate to form the elastic polyurethane proceeds at room temperature, the reaction is slow and in practice we apply heat to the mass to accelerate the cure. Thus, by heating to temperatures of, for example, 212 to 300° F., substantial cure can be effected in as little as 5 to 10 minutes, but if less highly elevated temperatures are employed, e.g., 125° F., longer times, such as 1 to 3 hours may be required to effect appreciable cure. Exposure of the mass to open steam or to steam under pressure in an autoclave is a convenient way of supplying simultaneously the water vapor required for curing as well as the elevated temperature desired to shorten the time of cure. If desired, the cure may be further facilitated by adding to the mass at an appropriate stage small amounts of catalytic or promoting materials known to accelerate the cure of polyurethane rubbers, such as tertiary amines, e.g., dimethylamino cyclohexane, or di(diethylamino ethyl) adipate, etc.

In a preferred aspect of the invention the mixture of disintegrated sponge or foam rubber scrap and liquid polyester-polyisocyanate intermediate is subjected to cure by exposure to steam in a mold or other confining means in which the rubber is confined in a definite volume during the cure, such definite volume most preferably being considerably less than the normal unconfined volume of the rubber sponge, that is, the mixture is substantially compressed before it is exposed to the curing conditions, and is maintained in this compressed condition during the cure. The mass is suitably compressed to about ¼ to ¾, and preferably about ½, of its original unconfined volume. This procedure results in particularly desirable qualities in the final cured product, and by controlling the degree of compression during the cure considerable corresponding control over the final density of the foam can be achieved, over a relatively wide range.

The following examples will serve to illustrate the practice of the invention in more detail.

*Example 1*

A polyester was prepared by heating at 220–230° C. the following mixture:

| | Moles |
|---|---|
| Propylene glycol | 11 |
| Ethylene glycol | 4.25 |
| Adipic acid | 11.25 |

In the course of the preparation of the polyester the unreacted glycol was removed by vacuum distillation, and the extent of the distillation determined the molecular weight of the polyester, as calculated from the acid number and the hydroxyl number. The polyester used in this example had a molecular weight of about 1800, a hydroxyl number of about 60 and an acid number less than 1.

The foregoing alkyd resin was mixed at a temperature of 85° C. with an excess of p,p'-diphenylmethane diisocyanate in the proportion of 80 parts by weight of the polyester to 20 parts of the diisocyanate. A reaction occurred between the hydroxyl groups of the alkyd and the isocyanate groups to form a polyurethane intermediate characterized by the presence of unreacted isocyanate groups. This intermediate was a liquid which was soluble in the common organic solvents such as acetone.

A 70% by weight solution of the foregoing uncured polyurethane intermediate in methyl isobutyl ketone, to be utilized as a spray solution, was charged to a spray supply container 10, shown in Fig. 1, such supply being connected by a line 11 to a suitable source (not shown) of compressed air or other gas under pressure, the arrangement being such that the solution in the tank 10 could thereby be sprayed from the nozzle of a spray gun 12 connected to the tank.

The spray gun is mounted adjacent to a mixing device 13, comprised of a feed hopper 14 and a longitudinally extending cylinder 15 constructed of wire screening or similar open material. A mixing screw 16 extends axially through the cylinder 15 and is adapted to be rotated by a suitable driving means 17 located at the rear of the mixing device.

Shredded vulcanized latex foam rubber scrap 18 is fed to the hopper 14, and is advanced through the mixing cylinder 15 by the action of the rotating screw 16. At the same time, the solution of uncured polyurethane intermediate contained in the tank 10 is sprayed by the spray gun 12 through the cylindrical screen 15 onto the sponge rubber crumbs 18 as they are advanced through the mixing chamber.

To lower the viscosity of the spray solution and thereby facilitate the spraying operation, the spray solution supply tank may be heated to a suitable temperature, e.g., 160–170° F., by a suitable heating means (not shown).

The rate of advancement of the sponge rubber crumb 18 through the mixing device 13 and the rate at which the polyurethane intermediate solution was sprayed into the rubber crumbs were so regulated in this example that from 5 to 10 parts by weight of the shredded latex foam received 1 part by weight of the spray solution. As the sprayed particles are carried along the mixing chamber they are tumbled by the action of the feed screw, and the liquid intermediate is thereby distributed uniformly over the entire surface of the crumbs. Much of the liquid enters into the pores of the foam rubber particles, and the mixture presents an essentially dry, flowable and spreadable consistency.

As the sprayed crumbs emerge from the delivery end of the mixing device, they are deposited on a conveyor belt 20, which proceeds horizontally beneath a series of transverse spreader bars 21, which serve to spread the treated foam rubber crumbs out into the form of a uniform mat 22. The belt 20 is made of any suitable material to which the mixture will not stick, and it is preferably made of a laminate of glass fibers and polyester resin, such as is described in U.S. Patent 2,667,430 of Wells. The conveyor belt is perforated with numerous small holes or other similar openings, in order to permit vapors and gases to pass therethrough. After the treated crumbs are spread out on the belt into a loose layer or sheet 22, they pass into contact with a second similar belt 24 disposed immediately above the first belt 20, and spaced therefrom by a vertical distance which is equal to the desired thickness of the final sheet. This spacing is such that the loose rubber crumb is appreciably compressed at this stage. The two moving belts 20, 24, with the compressed layer 22 of treated crumbs sandwiched therebetween, then pass into an oven 26, within which an atmosphere of live steam is maintained, the temperature being about 212° F. Upper and lower guide rolls 27, 28 maintain the desired spacing of the upper and lower belts, and the steam passes through the perforations or similar openings in the belts into the mass of treated foam crumbs. The speed at which the conveyor belts are advanced is such that the treated foam rubber crumb is exposed to the steam for about 10 or 15 minutes. As a result of this treatment the polyurethane intermediate acquires a substantial amount of cure by the action of the water on the available isocyanate groups in such intermediate, and at the same time carbon dioxide is generated by the chemical reaction so that the resulting polyurethane elastomer is spongy. The cured polyurethane elastomer forms a strong, integrating network which permeates and surrounds the latex foam rubber particles and is firmly adhered thereto, so that the sheet 22 now has the form of a continuous, integral mass, which may be wound up into a roll 30 as it comes from the machine. The roll 30 may be dried subsequently to remove residual moisture, and to remove any remaining organic solvent.

Finished continuous sheets of latex foam rubber reclaim have been made by this method ranging in thickness from ¾" to 2" and in densities varying from 7 pounds per cubic foot to 13 pounds per cubic foot, depending on the amount of compression to which the particles are subjected during the steam cure.

*Example 2*

A polyester resin was prepared as in Example 1, as follows:

A mixture of 27 moles of adipic acid, 28 moles of diethylene glycol, and 2 moles of 1,1,1-trimethylolethane, plus 0.25% by weight of p-toluene sulfonic acid (based on the reaction mix) as catalyst, was heated for 18 hours under nitrogen gas, at temperatures of 180°–200° C., water vapor being removed as formed. At the end of the reaction vacuum was applied to strip out any water remaining. The polyester thus obtained had a viscosity of 15,000 cps. (25° C.), an acid number less than 2, a hydroxyl number of 60, a molecular weight of about 2480, and an equivalent weight of 920.

100 parts of the foregoing polyester were mixed with 50 parts of a commercial diisocyanate known as Hylene TM (a mixture of toluene diisocyanate isomers comprising 80% of 2,4-toluene diisocyanate and 20% of 2,6-toluene diisocyanate by weight). An exothermic reaction took place, yielding a liquid uncured polyurethane isocyanate having an excess of available isocyanate groups. This intermediate was sprayed by means of a pressurized hot spray system onto shredded latex scrap foam at the rate of 1 part of the polyurethane intermediate by weight to 9 parts of the shredded scrap foam. The uniformly mixed sprayed mass was placed in a mold 35, as shown in Fig. 2, comprised of upper and lower hinged sections 36, 37 and containing inwardly projecting cores 38. Numerous holes 39 were provided through the walls of the mold to permit vapors to pass therethrough into the mass of treated latex foam scrap contained therein. The mold was placed in a steam chamber at a temperature of 212° F. for 12 minutes. The resulting molded latex foam scrap had desirable physical properties.

*Example 3*

100 parts by weight of a polyester as in Example 2 having a hydroxyl number of 64.4 and an acid number of 2.5 were mixed with 21.4 parts by weight of toluene diisocyanate. This mixture was allowed to exotherm and return to room temperature. The resultant prepolymer was mixed with an equal weight of methyl isobutyl ketone to make a 50% solution. This 50% solution was then sprayed onto shredded scrap foam at a ratio of one part by weight of prepolymer solution to ten parts by weight of shredded scrap foam. The sprayed shredded foam was compressed 50% and while compressed was subject to a 12 minute steam cure at 212° F. The entire spray, leveling and cure operation was carried out on the machine mentioned in the application. The result was a resilient sheet of reclaim. This operation was also carried out satisfactorily using ground polyurethane foam instead of latex foam.

*Example 4*

100 grams of a polybutyleneetherglycol having a molecular weight of about 3100, a hydroxyl number of 36 and an acid number of less than 1 were mixed with 31 grams of toluene diisocyanate to form a prepolymer. This prepolymer was then mixed with an equal weight of methylisobutyl ketone to make a 50% solution. This prepolymer solution was then sprayed onto scrap foam at a ratio of one part by weight of prepolymer solution to six parts by weight of scrap latex foam. The sprayed foam was placed in a mold having a loose fitting cover to permit the passage of steam, compressed approximately 50% and subject to a fifteen minute steam cure at 212° F. A soft resilient rebonded foam mass resulted.

*Example 5*

Shredded latex scrap foam was sprayed according to Example 1 except that the sprayed mass was placed in a mold and sprayed with a 10% solution of N-methylmorpholine in water so that the top surface of the treated foam was uniformly wet. The mold was then tightly closed, the foam being compressed approximately 40%, and the mold placed in a hot air oven at 150° F. The mold was heated in this oven for 45 minutes to allow the moist atmosphere in the mold to thoroughly permeate the treated foam and react with the isocyanate intermediate. The result was a rebonded molded foam article exhibiting good resilience.

From the foregoing it will be apparent that the invention affords a convenient and economical method for converting otherwise comparatively valueless latex foam rubber scrap into shaped foam or sponge rubber articles that are valuable and highly useful. The resulting reclaimed foam rubber is stronger and more satisfactory in general than would be obtainable by using various rubber cements as the bonding agent. The present product has good tensile properties, particularly static fatigue, and it avoids the relatively high costs that would be incurred if it were attempted to bind the shredded latex foam scrap together with virgin latex foam.

Having thus described my invention, what I claim and desire to protect by Letters Patent is:

1. Reclaimed rubber latex foam comprising particles of shredded vulcanized rubber latex foam bound into an integral mass by a network of firmly adhered cured polyurethane elastomer sponge.

2. A sheet of elastic sponge comprising shredded vulcanized rubber latex foam crumb bound together by a firmly adherent integrating network of cured polyurethane elastomer sponge.

3. A method of making a shaped body of elastic sponge comprising mixing shredded rubber latex foam with an uncured polyurethane polymer, confining the mixture in a desired form, and subsequently converting the uncured polyurethane into a cured elastomeric sponge which adheres firmly to the said shredded latex foam, whereby the said shredded latex foam is firmly bound together into an integral mass by the thus cured in situ polyurethane elastomer sponge.

4. A method of reclaiming vulcanized rubber latex foam scrap comprising shredding said scrap into crumbs, mixing said crumbs with a liquid comprising an uncured polyurethane elastomer intermediate, confining the mixture in a desired shape within a porous confining means, introducing steam into said porous confining means to convert said polyurethane intermediate within the mixture into a cured spongy elastomer, the said crumbs thereby being bound firmly into an integral mass by said cured and foamed in situ polyurethane elastomer.

5. A method of reclaiming vulcanized rubber latex foam scrap comprising shredding said scrap into crumbs, mixing said crumbs with a liquid comprising a solution of an uncured polyurethane elastomer intermediate in a volatile organic solvent, compressing the mixture within a porous confining means having the shape of a desired article, exposing said porous confining means to water vapor and elevated temperature to convert the said polyurethane contained in the compressed, confined mixture into a cured spongy elastomer, the said crumbs thereby being bound firmly into an integral mass by said cured and foamed in situ polyurethane elastomer.

6. A method of making a shaped body from vulcanized rubber latex foam crumbs comprising uniformly mixing said crumbs with a liquid comprising an uncured polyester-polyisocyanate intermediate containing available isocyanate groups, compressing said mixture within a confining means having the desired shape, supplying moist heat to the mixture while so compressed and confined, said moist heat causing simultaneous cure and foaming of said intermediate whereby it is converted into a spongy elastomeric mass that serves to bind said crumbs together into a coherent elastic mass of the desired shape.

7. A method of making a continuous elastic sponge blanket of definite thickness from vulcanized rubber latex foam crumbs comprising spraying said crumbs with a liquid composition comprising an uncured polyester-diisocyanate intermediate containing available isocyanate groups, tumbling the said sprayed crumbs to distribute the said liquid uniformly throughout the crumbs, depositing the said crumbs on the surface of a porous conveyor belt, spreading the thus treated crumbs out on the belt to form a blanket of definite thickness thereon, advancing the said belt and blanket of treated crumbs thereon into engagement with a second porous belt spaced from said first mentioned belt by a distance less than the thickness of the blanket of treated crumbs, whereby the blanket of treated crumbs is compressed between the two said porous belts, advancing the assembly into a chamber containing steam, whereby the steam passes through the said holes in the belts into the said treated crumbs and acts on the said intermediate to simultaneously cure the intermediate and cause it to foam whereby the intermediate is converted into a spongy elastomer that serves to integrate the crumbs into a continuous blanket of the desired shape, and thereafter releasing the blanket from said confinement.

References Cited in the file of this patent

UNITED STATES PATENTS

| | | |
|---|---|---|
| 2,200,847 | Madge et al. | May 14, 1940 |
| 2,315,366 | Daley et al. | Mar. 30, 1943 |
| 2,319,042 | De Wyk | May 11, 1943 |
| 2,480,851 | Goss | Sept. 6, 1949 |
| 2,608,536 | Sterling | Aug. 26, 1952 |
| 2,634,244 | Simon | Apr. 7, 1953 |
| 2,634,252 | Simon et al. | May 19, 1953 |
| 2,655,458 | Collins | Oct. 13, 1953 |
| 2,729,618 | Muller | Jan. 3, 1956 |
| 2,764,565 | Hoppe et al. | Sept. 25, 1956 |

FOREIGN PATENTS

| | | |
|---|---|---|
| 1,103,628 | France | May 25, 1955 |

OTHER REFERENCES

Goggin et al.: Foamed Plastics, British Plastics, pages 528–536, December 1947.